US006968606B2

(12) United States Patent
Fromm et al.

(10) Patent No.: US 6,968,606 B2
(45) Date of Patent: Nov. 29, 2005

(54) APPARATUS AND METHODS FOR CONNECTING A MOVABLE SUBSYSTEM TO A FRAME

(75) Inventors: Paul M. Fromm, Rochester, NY (US); Richard C. Benton, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 434 days.

(21) Appl. No.: 10/248,680

(22) Filed: Feb. 7, 2003

(65) Prior Publication Data

US 2005/0044713 A1 Mar. 3, 2005

(51) Int. Cl.[7] .......................... B23P 11/00; A47B 88/00
(52) U.S. Cl. ....................... 29/434; 29/469; 312/334.1; 312/334.4
(58) Field of Search .......................... 29/434, 446, 448, 29/462, 469; 312/334.1, 334.4

(56) References Cited

U.S. PATENT DOCUMENTS 3,600,782 A * 8/1971 Manson et al. .......... 29/898.03
3,649,090 A * 3/1972 Dutot .......................... 384/23
4,553,307 A * 11/1985 Kaltz et al. ................... 29/434
5,033,805 A * 7/1991 Hobbs ................... 312/334.11
5,085,523 A * 2/1992 Hobbs ......................... 384/21
5,484,197 A * 1/1996 Hansen et al. ......... 312/334.12
5,575,318 A * 11/1996 Susnjara ..................... 144/2.1
5,592,728 A * 1/1997 Susnjara ...................... 29/434
5,890,811 A * 4/1999 Bryson ........................ 384/42
5,974,667 A * 11/1999 Bryson .................... 29/898.03
6,158,123 A * 12/2000 Bryson .................... 29/898.03
6,669,263 B2 * 12/2003 Asai .......................... 296/97.9
6,772,985 B2 * 8/2004 Lee ........................... 248/424
6,871,920 B2 * 3/2005 Greenwald et al. ...... 312/334.4
2002/0021061 A1 * 2/2002 Lammens .............. 312/334.44

* cited by examiner

*Primary Examiner*—Essama Omgba
(74) *Attorney, Agent, or Firm*—Oliff & Berridge, PLC

(57) ABSTRACT

An assembly has a frame that defines at least one opening and a subsystem that is movable relative to the frame. At least one slide connects the subsystem to the frame such that the weight of the subsystem transmits a force to the slide. The slide includes at least one projection that extends through the at least one opening in the frame. At least one urging member biases the projection to at least partially counter the force transmitted to the slide by the weight of the subsystem. At least one docketing pin slides into at least one docking hole with minimal vertical load on the docking hole.

18 Claims, 10 Drawing Sheets

APPARATUS AND METHODS FOR CONNECTING A MOVABLE SUBSYSTEM TO A FRAME

BACKGROUND OF THE INVENTION

1. Field of Invention

This invention relates to apparatus and methods for connecting a movable subsystem to a frame.

2. Description of Related Art

Many machines, such as imaging devices, copiers, fax machines and printers, for example, have subsystems that are movable relative to other components of the machine, such as a machine frame, for example. These subsystems may be moved for various reasons, for example, routine maintenance or to replace a dispensable material, such as paper, ink or toner, for example. In one example, the front panel of a copier may be opened and a subsystem, such as a fuser or paper drawer, may be slid out for maintenance or for reloading. These and other subsystems may be mounted on various types of sliding devices to allow them to be removed and replaced with an adequate amount of precision.

SUMMARY OF THE INVENTION

Machines that have slidable subsystems, i.e., subsystems that are slidable relative to other components of the machine, such as a machine frame, may, for example, have a rail or other type of member on which the subsystem slides (hereinafter "slide") that includes a fixed portion mounted to a portion of the machine frame. In some cases, for example, subsystem location tolerance requirements and mounting rigidity are more stringent than can be provided by the slide(s) alone. This may occur for example, when the subsystem is mounted on a ball slide or other such slide having rolling elements. In this case, locating pins or other such similar devices may be added to the subsystem and communicate with the corresponding holes in the machine frame. When a subsystem, for example, a paper drawer or fuser on a copier, is slid back into the machine after maintenance, these locating pins can slide into their corresponding holes, thus locating the subsystem to the machine frame with high precision and stiffness. However, the locating pins do not have to be mounted to the subsystem and instead can be associated with other components, such as the slide or subassembly frame, for example.

These locating pins or other such devices, may tend to resist the motion of the slides when a subsystem is being docked or undocked, due to a lack of compliance and misalignment due to tolerance between the locating pins and their corresponding holes in the machine frame. In other words, the locating pins or other devices may contact i.e., rub against, for example, the surface(s) of the machine frame defining their corresponding holes, which after continuous or extended usage, may result in damage to the locating pins and/or machine frame, and/or may make it more difficult for an operator to slide the subassembly.

To prevent, minimize or reduce this problem, slide mount screws that mount the slide to both the locating pins and the subsystem may be tightened after the subsystem is docked to the machine, thereby temporarily realigning the slide. However, this is not a very fast assembly procedure and may be easily skipped or done incorrectly. However, the slide mount screws may ultimately become loose again, thereby requiring periodic maintenance. This lack of alignment may ultimately be manifested, for example, by the locating pins dropping due to the deformation/warping of the slide. The slides may become deformed/warped due to being subjected to the weight of the subsystem over time. However, the lack of alignment between the locating pins and their corresponding holes may be caused by other reasons. For example, other acting forces of various components of the apparatus may cause a lack of alignment such as gravity acting to distort the frame if supported on rough or uneven surfaces.

The above circumstances may eventually result in high loads being exerted on the surfaces of the machine frame that defines the holes by the location pins. These loads will increase the force necessary to open and close the subsystem and also increase wear on various features of the machine, such as the surfaces of the machine frame defining the holes. In particular, a large amount of wear and deformation may be experienced on the locating pins and the corresponding holes in the machine frame. This wear may reduce mounting precision and thereby be responsible for mislocation of the subsystem relative to the machine frame and other components, which in turn can create operational problems with the machine, such as producing paper jams and creating bad images in the case of an imaging device, for example. A lack of mounting precision can also cause other non-operational problems.

The problem of wear between the locating pins and the machine frame may be addressed by installing bushings or other such elements in the mounting pin holes of a machine frame. Thus, when the bushings are worn due to continuous contact with the locating pins, they may be replaced without having to replace the entire machine frame. Conversely, the locating pins may also be removably mounted on the subsystem, subsystem frame or slide, such that they may also be replaced periodically when they become worn. In addition, sleeves may be provided on the locating pins that may be replaced when sufficiently worn. While the use of bushings, removable locating pins and sleeves may temporarily address the problem, they still require periodic maintenance to ensure that the machine continues to function at an optimum level.

While the problems above have been described with reference to a machine having locating pins that are mounted in corresponding openings, the apparatus according to this invention is intended to be used with any other applicable currently known or later developed device having mechanically interlocking members of various forms or shapes for precisely locating moving elements.

This invention provides systems and methods for using one or more urging members to both retain and bias the fixed portion of a slide relative to a machine frame. In various exemplary embodiments of this invention the urging member may be a torsion spring that is mounted to a rear side of a machine frame, for example. A projection, for example a tongue, on an end portion of the slide protrudes through the machine frame and passes over one leg of the torsion spring. When the slide is fully inserted into the machine frame, a leg of the torsion spring rises into a notch in the tongue to retain it and prevent the slide from being pulled out of the machine frame. The torsion spring may exert an upward force on the slide until the slide hits a top portion of its corresponding opening in the machine frame.

In various exemplary embodiments of this invention the biasing force applied by each urging member may be equivalent to the gravity induced load the subsystem exerts on the portion of the slide where the urging member is located. For example, one quarter of the mass of the subsystem. However, any number of urging members may be used, thereby varying the necessary biasing force to be applied by each urging member. In addition, the biasing force of each urging member may be varied based on the total percentage of the weight of the subsystem to be countered by all of the urging members. Because the urging member is exerting a force upward as the subsystem closes, it tends to counter the weight of the subsystem. This causes the pin to hole force to be minimized thereby reducing the wear on the locating pins and corresponding holes, as well as the frictional force required to insert the locating pins into their corresponding holes in the machine frame.

While the problems above have been described with reference to a spring, such as a torsion spring, the apparatus according to this invention is intended to be used with any other applicable currently known or later developed urging member.

In various exemplary embodiments of this invention, minor side-to-side motion of the subsystem may be allowed by compliance of the slide. In other exemplary embodiments, additional side-to-side motion may be allowed for, by installing a plate on the machine frame that is free to slide in one or more directions on the machine frame itself. The slide is then mounted to the plate, thus relieving any horizontal forces that may be transmitted from the machine frame to the slide. In one exemplary embodiment of this invention one side of the subsystem has mounting pins and projections that mount directly in openings in the machine frame, thus, having very little horizontal float. The other slide incorporates a plate that rests on the cut edge of tabs bent out of the back of the machine frame. The projection or tongue is inserted through an opening in the plate.

In this embodiment, the slide has little horizontal float in the plate, but the plate is free to move side-to-side relative to the machine frame. The corresponding pins on this side of the subsystem fit into holes in the machine frame that are elongated in a horizontal direction, for example, allowing the pins to float horizontally in the machine frame. This feature fixes the slide in a vertical direction. In this way, the load capacity of the slide is not compromised by letting the axis of maximum section modulus move off of vertical. In addition, this feature reduces lateral forces on the slides and subsystem, thus preventing warping that may occur to the slides or the subsystems.

While the problems above have been described with reference to a plate mounted to a machine frame that allows for movement in one or more directions, the apparatus according to this invention is intended to be used with any other applicable currently known or later developed member that is capable of supporting an end of the slide while allowing for float in at least one direction.

In various exemplary embodiments an urging member, such as a torsion spring is mounted onto a tab or holding member located on either the sliding plate or the machine frame itself. A leg of the spring that supports the slide has a “z” or “u” bend on it and is passed through a vertical slot in the plate or machine frame. This “z” or bend performs at least three functions. First, it holds the spring near the machine frame or plate as the slide projection is pushed over it. Second, it limits the vertical motion of the spring before the slide projection is installed, and third, it provides a handle on the front side of the machine frame or plate to disengage the spring from the slide projection. This may be especially helpful when the device of this embodiment is being disassembled, i.e., the slide is being removed from the machine frame or plate.

In various exemplary embodiments of this invention it may be preferable that a slot or notch in the projection that is engaged by the spring be at a slight angle, such that the spring leg will enter the slot even if it is located, for example, a few millimeters away from the frame or plate. In this case, the spring leg would then move towards the backplate as it moves into the slot, thus reducing float in a direction normal to the machine frame or plate. In various exemplary embodiments of this invention, the required gap for accommodating the spring is relatively small due to the fact that the tolerances for the various subsystems used with the machine may also be small. However, in other exemplary embodiments where tolerances are not required to be small, this gap may be relatively large.

In various exemplary embodiments of this invention, a slide assembly, which may encompass one or more slides, may be interchangeably mounted on a machine frame or plate. In other words, the entire slide assembly may be flipped upside down and mounted in the machine frame. In addition, because each individual slide may be interchangeable, the total number of individual parts necessary to assemble a slide assembly may be reduced.

The systems and methods of this invention also allow for greater speed in the mounting of a subsystem in a machine. In one exemplary embodiment of this invention the urging member or spring may be easily twisted and snapped onto the tab on the backplate or machine frame. The slide may then be simply pushed through an opening in the machine frame or plate without further adjustments. Thus, no screws or other fasteners are necessary and important assembly sequences are also not required.

While the various exemplary embodiments of this invention are discussed above in the context of an imaging device, it should be appreciated that the devices and methods of this invention are intended for use in any applicable field of endeavor, such as vending machines, gaming machines, etc., for example.

These and other features and advantages of this invention are described in or apparent from the following detailed description of the preferred embodiments.

BRIEF DESCRIPTION OF THE DRAWINGS

The invention will be described with reference to the accompanying drawings, in which like elements are labeled with like numbers and in which.

DETAILED DESCRIPTION OF PREFERRED EMBODIMENTS

For convenience of explanation, exemplary embodiments of the invention are described below with reference to the figures in the context of an imaging device, such as a copier, fax machine printer or the like. However, as previously discussed, all exemplary embodiments of the invention are intended to be used in any applicable field of endeavor.

Figure 1:
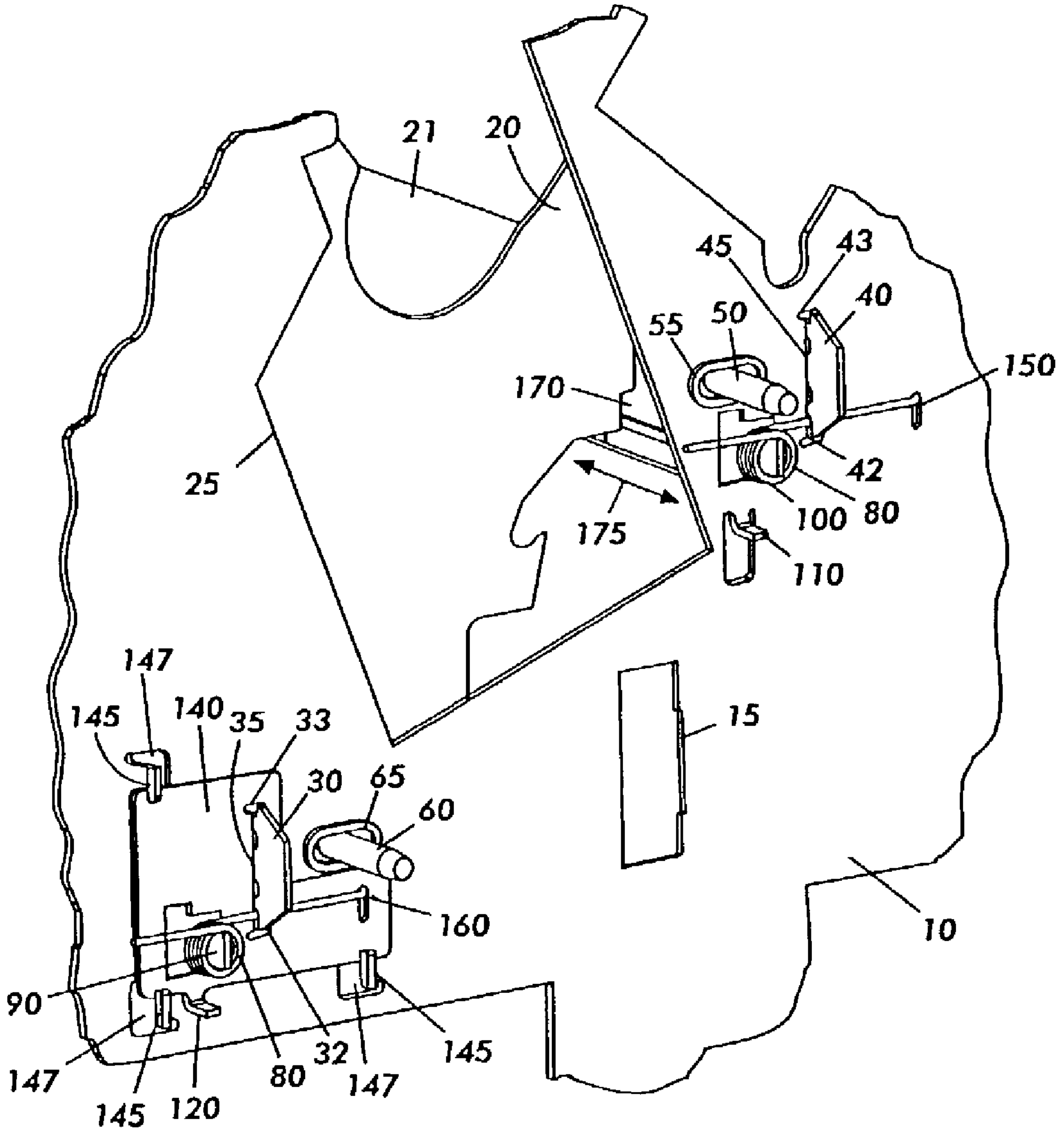
FIG. 1 shows an exemplary embodiment of the subsystem slide retainer mounted to a machine frame according to this invention.

FIG. 1 shows an exemplary embodiment of a subsystem slide retainer that is mounted to a machine frame 10. The machine frame 10 could be located in a device such as a fax machine, printer or copier, for example. Further, the machine frame 10 could be any type of member that is capable of supporting at least a portion of the weight of the subsystem 21 and subsystem frame 20. As illustrated in FIG. 1, the machine frame 10 is illustrated from its back side, having most of the accessible portions of the machine located on its opposite side. In various exemplary embodiments of this invention the back side of the machine frame 10 may not be readily accessible without extensive disassembly of the machine itself. Upper slide 170 and lower slide 130 (not shown) are mounted to the front side of the machine frame 10. A subsystem 21 having a subsystem frame 20 is mounted to both the upper slide and lower slide and is movable in the direction indicated by arrow 175. It should be appreciated that in various other exemplary embodiments the subsystem 21 need not be mounted to the subsystem frame 20, but instead may be mounted directly to at least one of the slides.

In various exemplary embodiments, the upper slide 170 and lower slide 130 may be ball slides or other such devices capable of translating both the subsystem 21 and subsystem frame 22. In various exemplary embodiments, the subsystem 21 may be a fuser, print cartridge, paper drawer or any other subsystem that may be required to be movably mountable to a machine. In various exemplary embodiments of this invention the subsystem 21 may be movable via automation, such as a motor or other such device, and may be required to move continuously as part of an operation. In other exemplary embodiments, the subsystem 21 may only be required to be moved during periodic maintenance or during reloading, as in the case of a fuser or paper drawer.

Locating pins 50 and 60 may be mounted on movable slide portions 172 and 132 (not shown) or they may be mounted directly to the subsystem frame 20 or the subsystem 21. When the subsystem is docked, locating pins 50 and 60 fit into corresponding holes 55 and 65, respectively. In this embodiment, locating pins 50 and 60 move freely in and out of holes 55 and 65 when the subsystem 21 is docked and undocked. It should be appreciated that locating pins 50 and 60 may be any type of device usable to precisely locate moving members. For example, these pins may be various shaped male and female connectors that are capable of performing the same function as locating pins 50 and 60. Further, the locating pins 50 and 60 need not be accommodated by holes in the machine frame, but instead may engage any type of fixed member on the machine frame 10.

Upper slide tongue 40 and lower slide tongue 30 fix upper slide 170 and lower slide 130 to machine frame 10 via insertion into corresponding openings 45 and 35. It should be appreciated that the tongues 40 and 30 may be any type of projection that is capable of transmitting a load from a slide to the machine frame or other member. The upper urging member 80 is mounted on the urging member holder 100. In this embodiment, the urging member is a torsion spring. However, other types of urging members may be used without departing from the spirit and scope of the invention. Urging member 80 fits into slot 42 of upper slide tongue 40 and is bent to make contact with tab 110. When urging member 80 is set in place it biases upper slide tongue 40 and upper slide 170 in an upward direction to counterbalance the weight of the subsystem 21. The urging member 80 may be sized to counterbalance the weight of the subsystem 21 and subsystem frame 20 such that the upper slide tongue 40 exerts little or no force in either direction (up or down) to the opening 45. Slots 45 and 35 are sized to allow vertical motion of the upper slide tongue 40, but little lateral motion. The vertical play accommodates part tolerances and variations when pin 50 is in hole 55. The small lateral clearance maintains the slide in a vertical orientation. Urging member retainer 150 accommodates a hook in the urging member 80 to prevent the urging member 80 from moving too far away from machine frame 10. The urging member 80 also has a hook portion 83 (not shown) that extends to the front side of the machine frame 10, the hook portion 83 may be pushed down from the front side of the machine frame to disengage upper slide tongue 40, thus allowing for disassembly of the upper slide 170 from the machine frame 10. It should be appreciated that the urging member 80 may be secured to the machine frame 10 in any manner that allows it to apply a biasing force to the slide.

When the urging member 80 is set in place and counterbalances upper slide tongue 40, locating pin 50 may freely move in and out of hole 55 without creating excessive wear on either locating pin 50 or the hole 55. Pin 50 has almost no vertical motion in hole 55. In various exemplary embodiments, a bushing or other such device (not shown) may be inserted in hole 55 such that no wear will occur in the machine frame in the event of any accidental or unanticipated misalignment between the locating pin 50 and the hole 55. Machine frame 10 has openings 25 and 15. These openings perform various functions such as allowing limited access to the back side of the machine frame 10, or mounting other connectors between the subsystem and frame.

Lower slide 130 has lower slide tongue 30 that fits through opening 35 in plate 140. The plate 140 is mounted to the machine frame 10 via plate retainers 145. These plate retainers are located in openings 147 in the machine frame 10 and allow for lateral movement (in the "horizontal" direction) of the plate 140 and thus of the lower slide 130 and lower slide tongue 30 relative to the machine frame 10. It should be appreciated that plate 140 may also allow for movement in other directions and may be movably mounted to the machine frame 10 by various different means. Locating pin 60 located in an elongated hole 65 may likewise move laterally relative to the machine frame 10. It should be appreciated that lateral or horizontal movement of the locating pin 60 may be permitted by various other means, for example, the locating pin 60 may be movably mounted to the subsystem 21, subsystem frame 20 or the lower slide 130. As discussed previously, this lateral movement is permitted in the lower slide 130 in order to accommodate location tolerance or variation between the two slides 130 and 170 while maintaining the vertical orientation of slide 130, preventing compromise of its load capacity by letting the axis of maximum section modulus move off of vertical.

Urging member 80 is mounted on lower urging member holder 90, connected to plate 140. As such, urging member 80 is also capable of translating laterally relative to the machine frame 10. In this embodiment, urging member 80 is illustrated as a torsion spring, having one end inserted in urging member retainer opening 160. Urging member 80 has a hook portion 83 (not shown) that protrudes from the back side of plate 140. This hook portion 83 prevents the urging member 80 from moving too far away from plate 140 and also allows for easy disassembly from the front side of machine frame 10. The other end of urging member 80 is placed in contact with tab 120 to exert a biasing force on lower slide tongue 30 and lower slide 130. As with the upper slide 170, this biasing force counterbalances the weight of the subsystem 21 and subsystem frame 20 and ultimately counteracts the load in a downward direction on slide 130. As such, locating pin 60 may freely slide in and out of hole 65 when subsystem 21 is docked or undocked. This reduces wear to the locating pin 60 and also to the upper and lower portions of hole 65. The biasing force applied by urging members 80 also assists in preventing the warping of upper slide 170 and lower slide 130. While the plate 140 is described above as accommodating the lower slide 130 it should be appreciated that the above arrangement could be applied to the upper slide 170 to accomplish a similar effect.

Urging member 80 exerts a biasing force on the lower slide tongue 30 at the point where the urging member is inserted into slot 32 on the lower portion of the tongue 30. It should be appreciated that in various exemplary embodiments the urging member may exert a biasing force to the tongues 30 and 40 at any point to allow the biasing force to be transmitted to the slides. The lower slide tongue 30 has an elongated slot 32 to accommodate the diameter of the spring, the thickness of the machine frame 10 and the thickness of the plate 140. As lower slide 130 and upper slide 170 are interchangeable, slot 32 of lower slide tongue 30 corresponds to slot 42 of upper slide tongue 40. Slot 42 accommodates both the machine frame 10 and the urging member 80. Conversely, slot 32 of lower slide tongue 30 corresponds to slot 43 of upper slide tongue 40.

Figure 2:
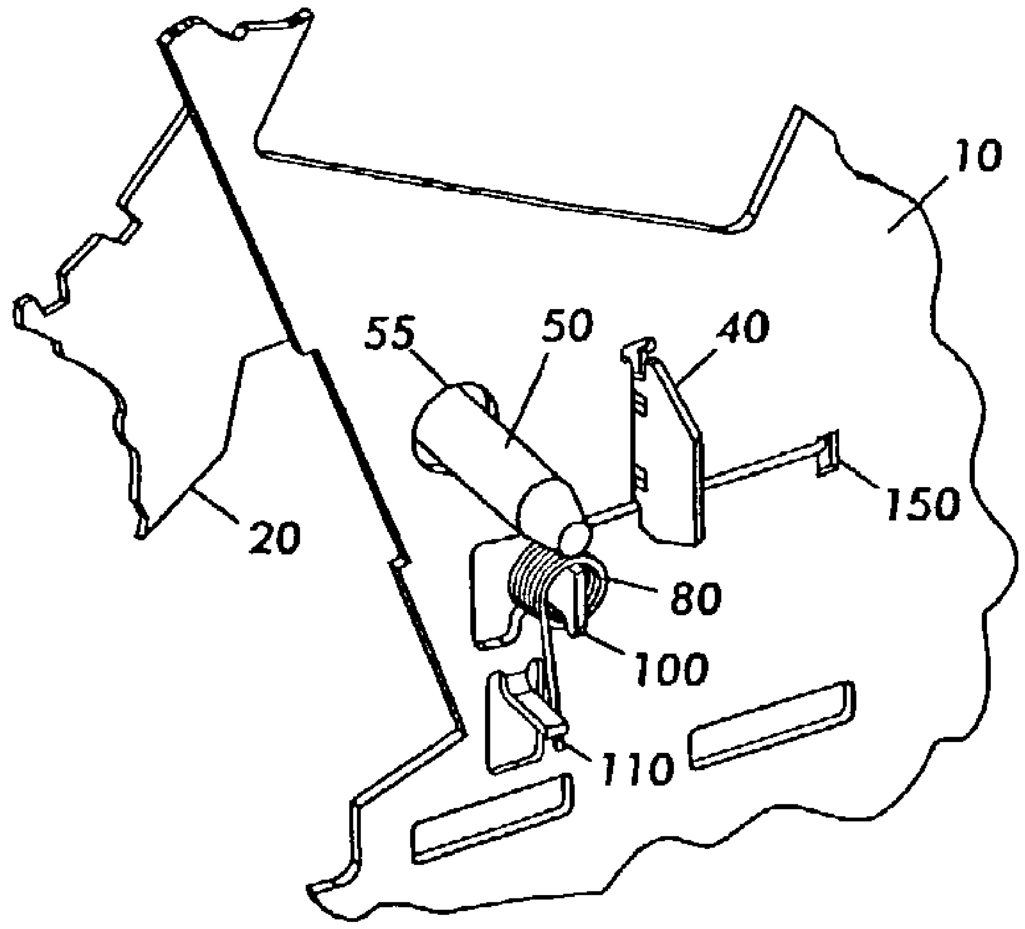
FIG. 2 is an exemplary embodiment of an upper slide with mounting pin and urging member and no horizontal float.

FIG. 2 is an exemplary embodiment of an upper slide having a locating pin 50 and urging member 80. Urging member 80 is mounted on urging member retainer 100 which in turn is mounted on machine frame 10. As shown in FIG. 1, upper slide 170 has upper slide tongue 40 inserted through machine frame 10. Locating pin 50 is inserted in hole 55 and may be directly mounted to subsystem frame 20. In this embodiment, the urging member 80 is illustrated as being connected in opening 150 and biased against tab 110. As such, urging member 80 exerts a biasing force in an upward direction against upper slide tongue 40 and upper slide 170, thus counterbalancing the weight of subsystem 21 and subsystem frame 20.

Figure 3:
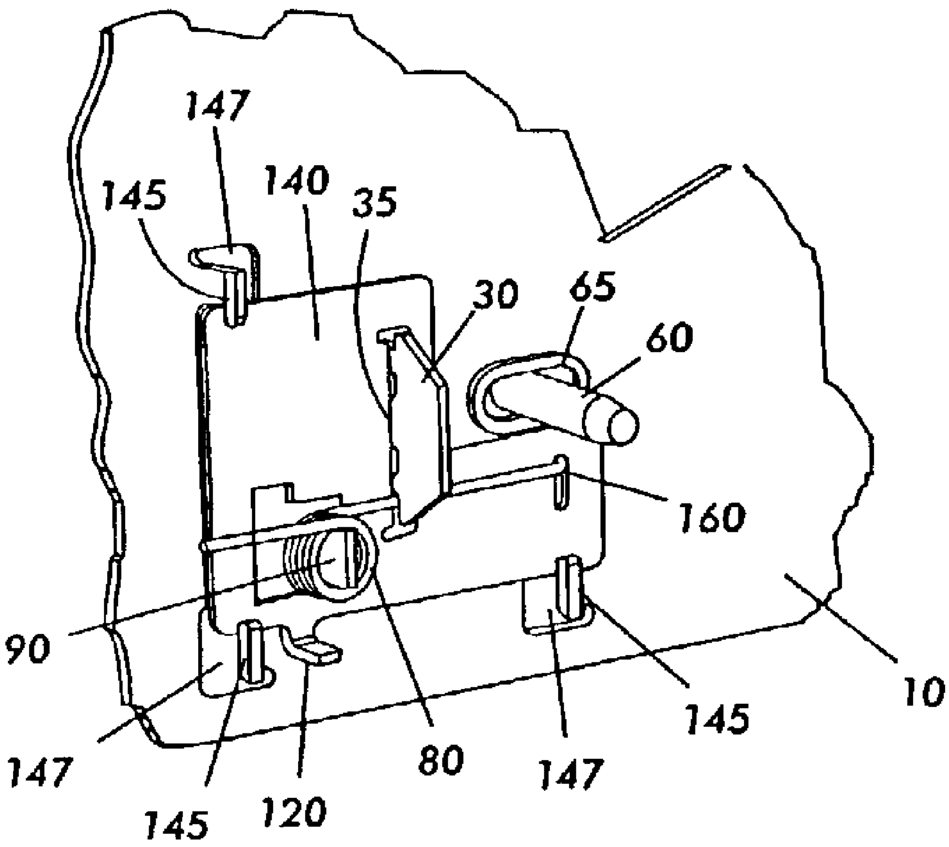
FIG. 3 is an exemplary embodiment of a lower slide with mounting pin, urging member and plate with horizontal float.

FIG. 3 is an exemplary embodiment of lower slide 170 having locating pin 60, urging member 80 and plate 140. In this embodiment, both the plate 140 and the elongated hole 65 permit movement of the lower slide in a lateral direction ("horizontal" direction). This occurs because plate 140 is slidably mounted on machine frame 10 via plate retainers 145 formed in openings 147 of machine frame 10 and located at upper and lower portions of plate 140. Locating pin 60 is permitted to move laterally via the elongated hole 65. Thusly, the lower slide 130 and lower slide tongue 30 are permitted to move laterally, reducing lateral forces on the machine frame 10, slide 130, subsystem frame 20 and subsystem 21.

Figure 4:
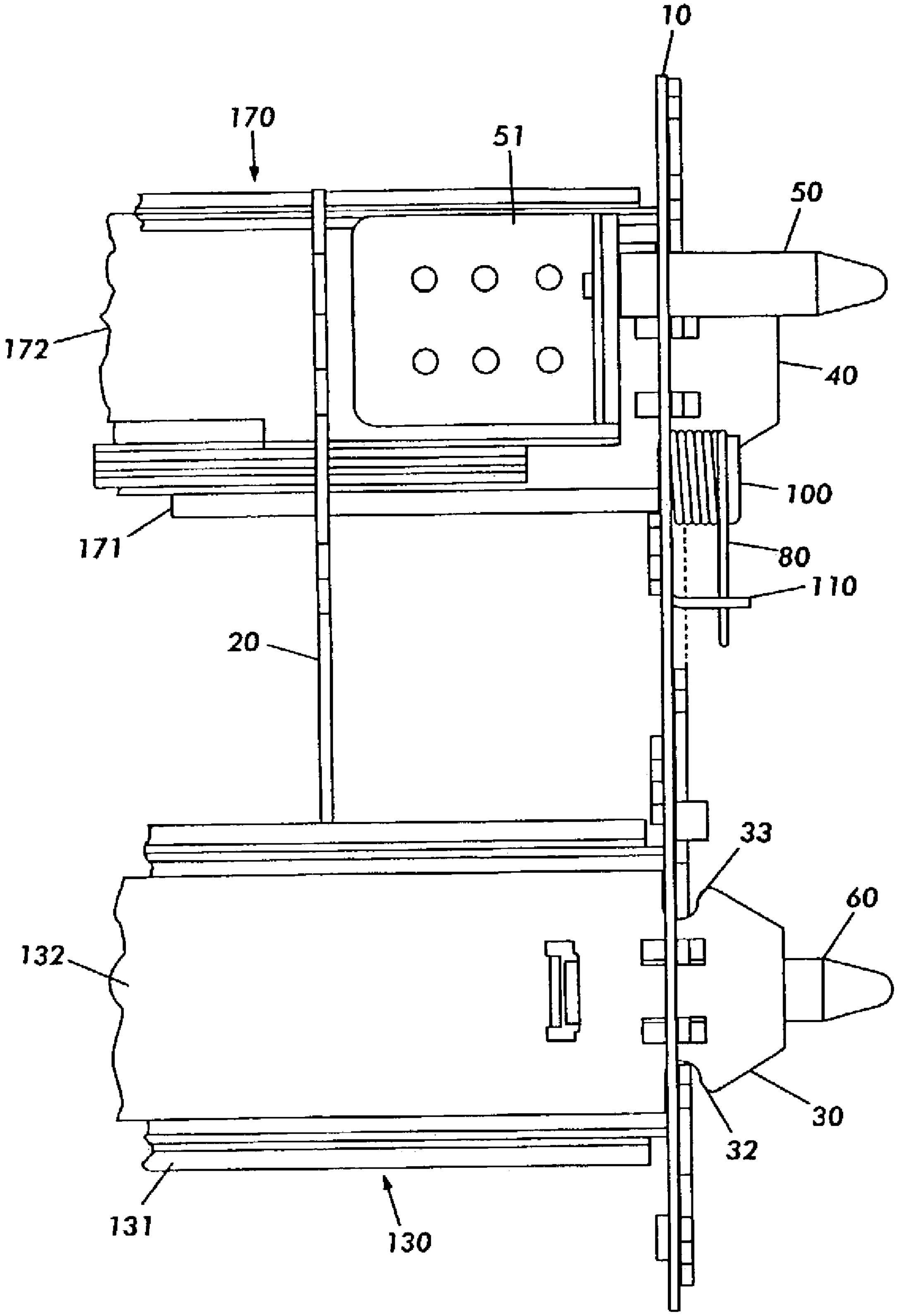
FIG. 4 shows a side view of the subsystem slide retainer of FIG. 1.

FIG. 4 illustrates a side view of the exemplary embodiment of the subsystem slide retainer of FIG. 1. In this figure, subsystem 21 and subsystem frame 20 are illustrated in the docked position with locating pin 50 and locating pin 60 protruding through their respective holes 55 and 65 in machine frame 10. The upper urging member holder 100 carries the upper urging member 80, which is illustrated exerting a biasing force against tab 110, thus biasing upper slide tongue 40 in a vertical direction. Upper slide 170 has a fixed portion 171 and a movable portion 172. It should be appreciated that the slides 130 and 170 may have any number of moving portions or may consist of a single fixed portion that allows the subsystem frame 20 or subsystem 21 to translate relative to the machine frame 10. In addition the slides 130 and 170 may incorporate any type of ball bearing or rolling type device.

The movable portion 172 is attached to the subsystem frame 20 which in turn is attached to the subsystem 21. As stated previously the slides 130 and 170 may be mounted directly to the subsystem 21. In this exemplary embodiment, the movable slide portion 172 may move relative to the fixed portion 171 via ball bearings or other such similar devices which reduce or eliminate friction or resistance between moving members. Lower slide 130 also has a fixed slide portion 131 that is fixed to the machine frame 10 and a movable slide portion (not shown) that is fixed to the subsystem frame 20 and ultimately subsystem 21. Lower slide retainer 30 has slots 33 and 32 formed on lower slide tongue 30. It should be appreciated that slots 33 and 32 may be located at various portions of the tongue 30. In this embodiment the location of the slot 32 accommodates both plate 140 and machine frame 10 and also engages urging member 80.

Figure 5:
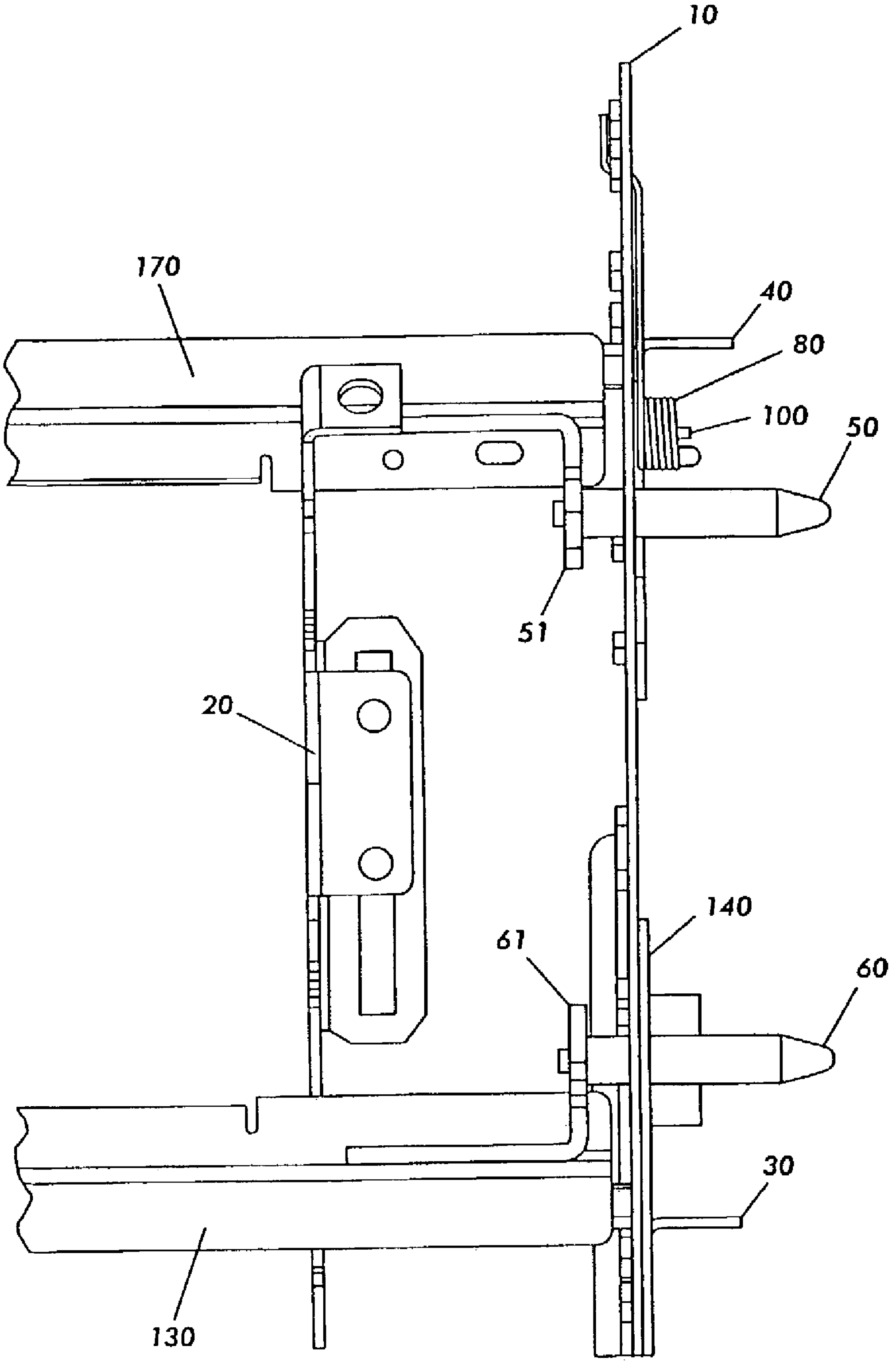
FIG. 5 illustrates an overhead view of the subsystem slide retainer of FIG. 1.

FIG. 5 is an overhead view of the exemplary embodiment of the subsystem slide retainer of FIG. 1. Subsystem frame 20 is illustrated in the docked position having locating pins 50 and 60 protruding through their respective holes 55 and 65 in machine frame 10. Upper slide retainer 40 and lower slide retainer 30 are illustrated in place mounted to machine frame 10. Urging member 80 is mounted on the upper urging member holder 100 and is illustrated in place exerting a biasing force in the vertical direction on upper slide retainer 40. In this embodiment, locating pin 50 is illustrated as being fixed to locating pin frame 51 and locating pin 60 is illustrated as being fixed to locating pin frame 61. Frames 51 and 61 are in turn fixed to movable slide portion 132 and movable slide portion 172 of lower slide 130 and upper slide 170, respectively.

Figure 6:
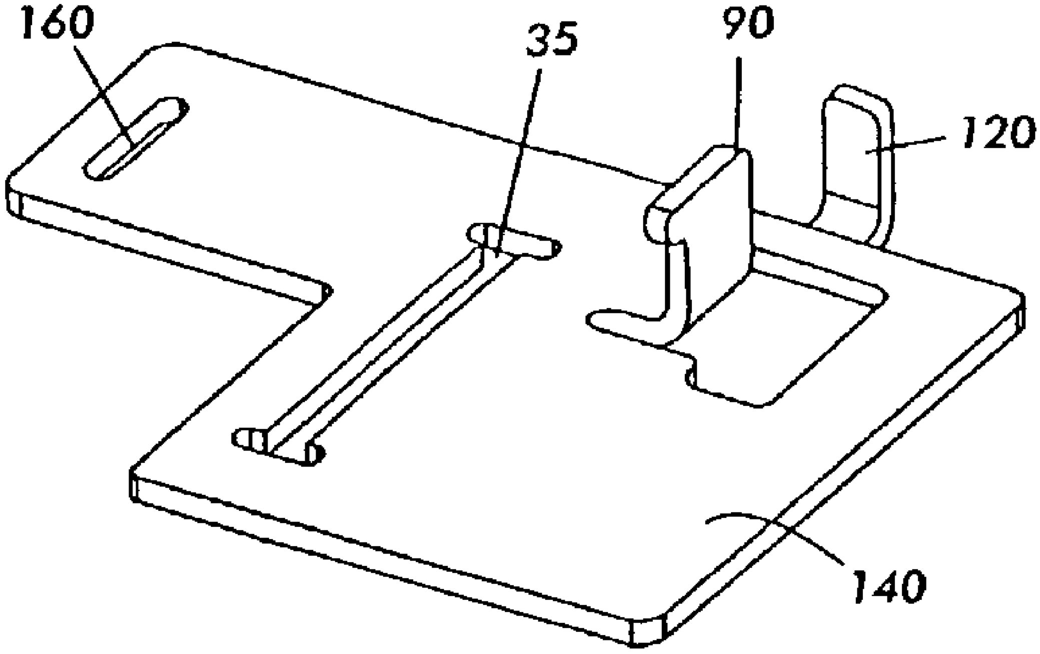
FIG. 6 illustrates an exemplary embodiment of a plate for use with a slide retainer of this invention.

FIG. 6 is an exemplary embodiment of a plate for use with a slide of this invention. Plate 140 may be mountable on a machine frame 10 to allow lateral movement of a lower slide 130. Plate 140 may also be used in other exemplary embodiments of this invention to allow lateral movement of an upper slide 170. Plate 140 has an urging member holder 90 and a spring tab 120 for accommodating an urging member 80. The opening 35 accommodates a slide projection such as a tongue 30 to allow vertical motion of the slide in machine frame 10, but not to allow lateral motion, thus, keeping the slide in a vertical orientation. Urging member retainer opening 160 accommodates one end of an urging member, such as a torsion spring. Plates 140, slide 30 and urging member 80 all move together laterally relative to machine frame 10.

Figure 7A:
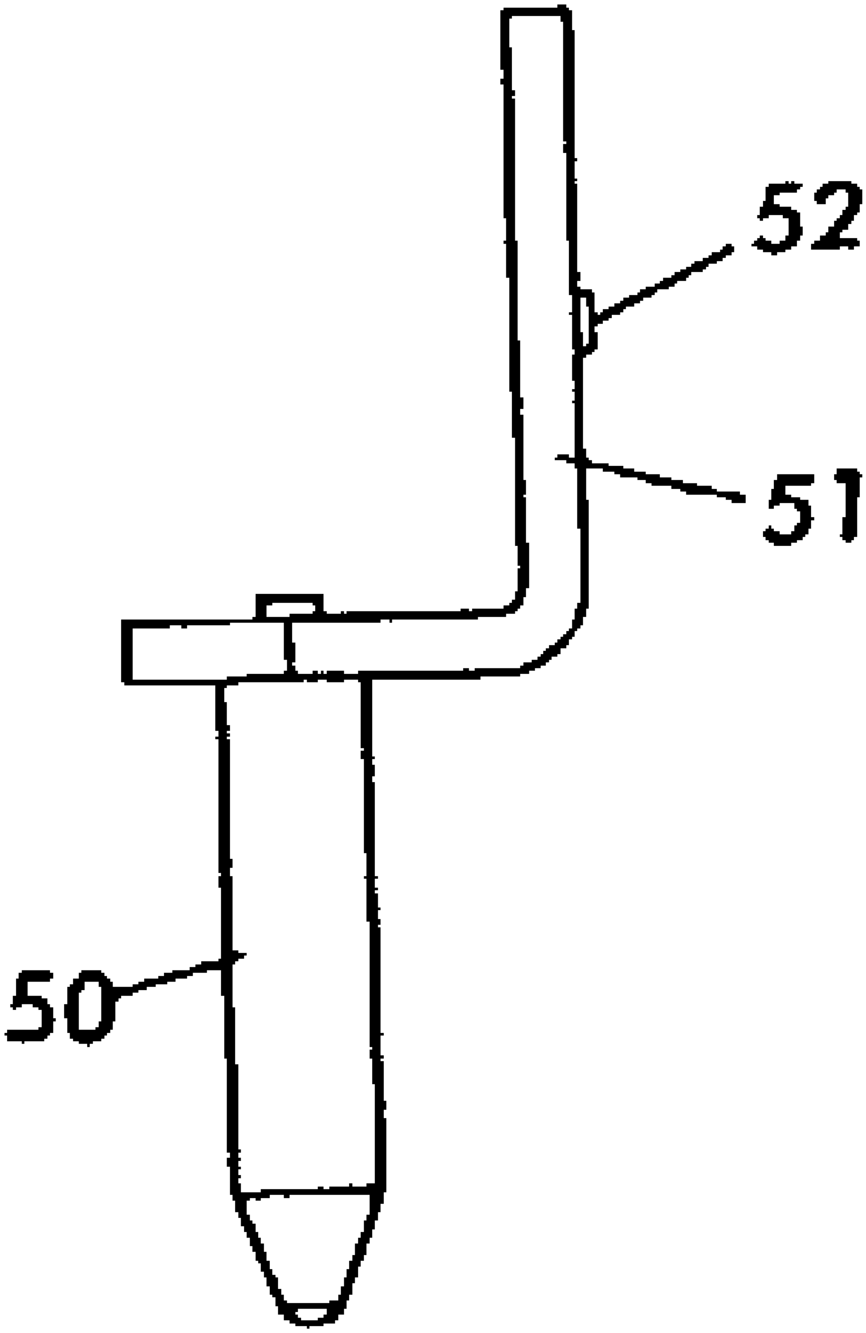
FIGS. 7A and 7B illustrate an exemplary embodiment of a locating pin according to this invention.
Figure 7B:
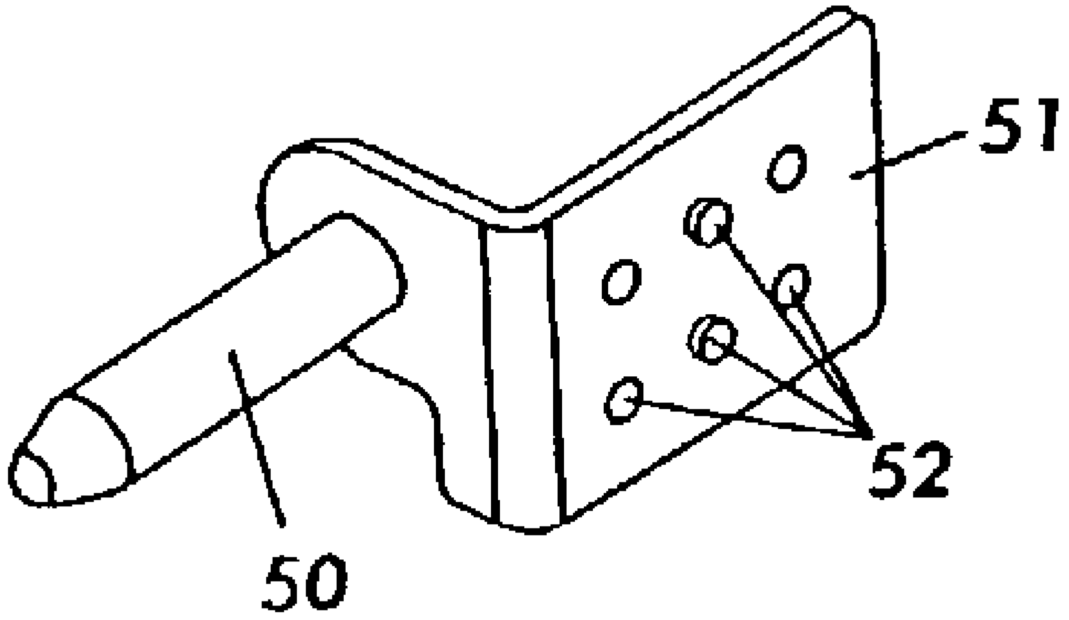

FIGS. 7A and 7B are exemplary embodiments of a locating pin 50 having a locating pin frame 51 according to this invention. Locating pin 50 is fixed to locating pin frame 51 which may then be fixed to the movable portion of a slide via locating pin frame fasteners 52. As stated previously, locating pin 50 and locating pin frame 51 may be fixed to either the movable portion of a slide, a subsystem frame or the subsystem itself. In various exemplary embodiments the locating pins may be movably fixed to a slide, subsystem frame, or subsystem to allow movement in at least one direction.

Figure 8A:
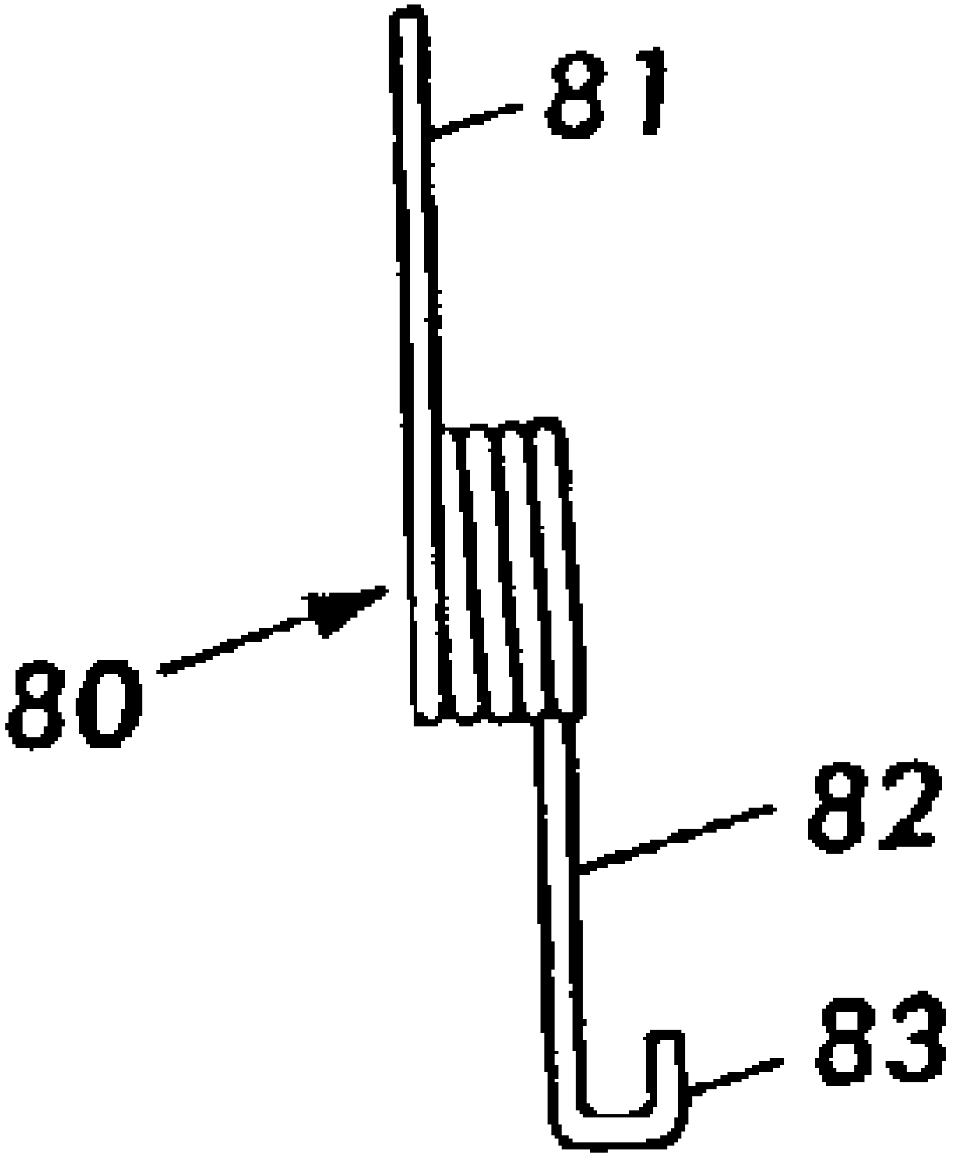
FIGS. 8A and 8B illustrate an exemplary embodiment of an urging member according to this invention.
Figure 8B:
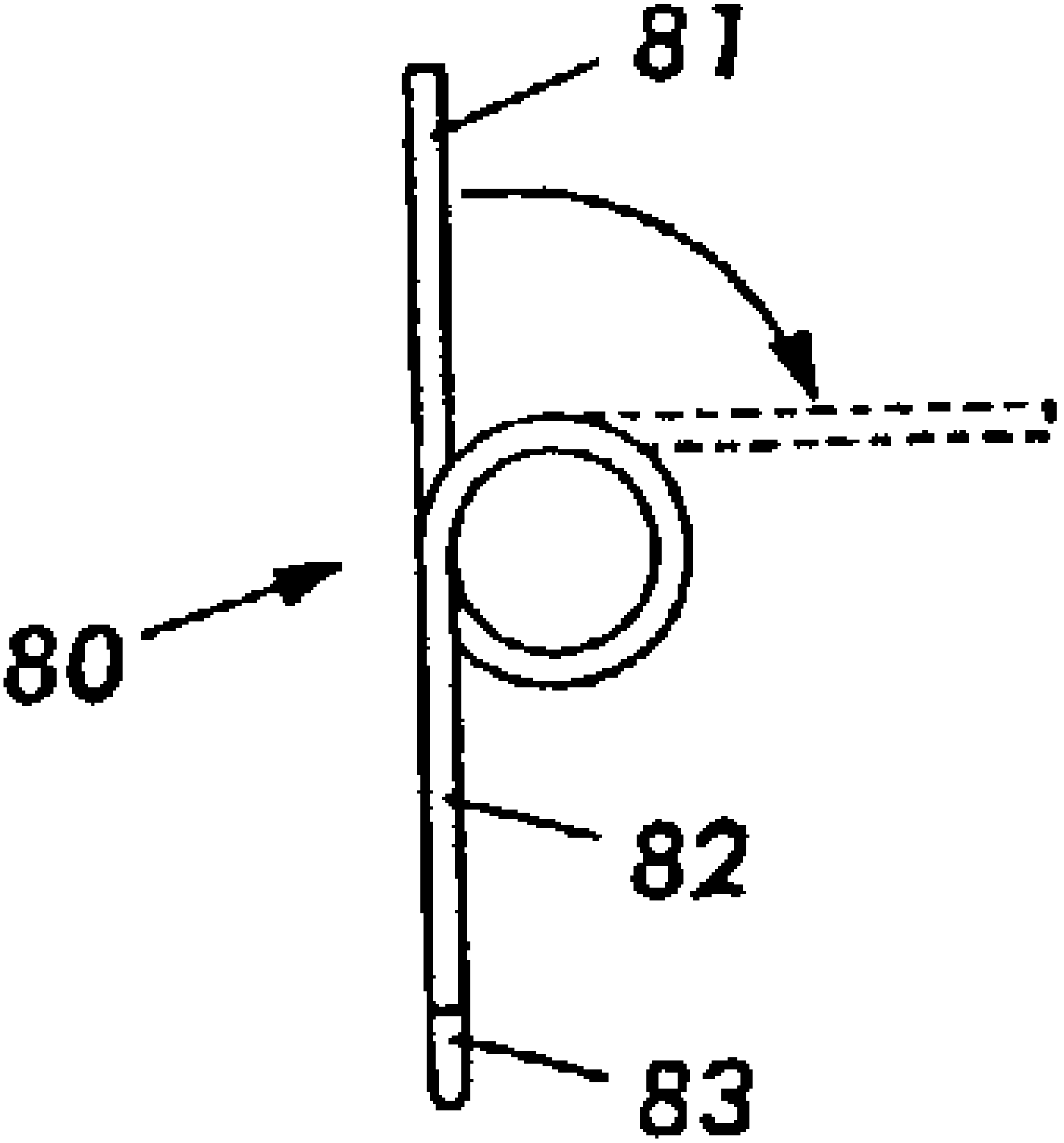

FIGS. 8A and 8B are exemplary embodiments of an urging member 80 according to this invention. In this embodiment, urging member 80 is a torsion spring having leg 81 and leg 82. Leg 82 has a hook portion 83 for accommodating the urging member retainer opening of either a plate 140 or a machine frame 10. FIG. 8B illustrates urging member 80 in the set position with leg 81 bent at an approximate 90° angle to leg 82. While FIG. 8B illustrates leg 81 bent at an approximate 90° angle, it should be appreciated that leg 81 may be bent to any angle in order to produce the desired biasing force on the slide and slide tongue. In addition, while the exemplary embodiments illustrated show a torsion spring, it should be appreciated that any type of urging member may be used to produce the desired effect in both the slide and slide tongue.

While this invention has been described in conjunction with the specific embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention as defined in the following claims.

What is claimed is:

1. An assembly, comprising:

a frame that defines at least one opening;

a subsystem movable relative to the frame;

at least one slide connecting the subsystem to the frame such that the weight of the subsystem transmits a force to the at least one slide, the at least one slide including at least one projection that extends through the at least one opening in the frame; and at least one urging member that biases the at least one projection to at least partially counter the force transmitted to the at least one slide by the weight of the subsystem.

2. The assembly of claim 1, wherein the at least one projection is a tongue.

3. The assembly of claim 2, wherein the tongue further defines a slot that accommodates the at least one urging member.

4. The assembly of claim 1, wherein the frame further comprises at least one second opening, and the at least one slide includes at least one pin that extends through the at least one second opening of the frame.

5. The assembly of claim 4, further comprising a bushing that is mountable in the at least one second opening.

6. The assembly of claim 1, wherein the frame further comprises at least one second opening, and the subsystem includes at least one pin that extends through the at least one second opening of the frame.

7. The assembly of claim 6, wherein the at least one pin is removably mounted on the slide.

8. The assembly of claim 1, further comprising at least one urging member holder mounted to the frame to hold the at least one urging member in place.

9. The assembly of claim 8, wherein the at least one pin is removably mounted on the subsystem.

10. The assembly of claim 1, further comprising at least one urging member retainer that resists the at least one urging member from moving away from the frame.

11. The assembly of claim 1, further comprising at least one tab mounted to the frame to counter balance the bias force exerted on the at least one projection by the at least one urging member.

12. The assembly of claim 1, wherein the at least one urging member is a torsion spring.

13. The assembly of claim 12, wherein the torsion spring has a hooked portion that fits in the at least one urging member retainer.

14. The assembly of claim 1, wherein the at least one slide further comprises a movable portion and a fixed portion.

15. The assembly of claim 1, further comprising a sliding plate movably mounted on the frame that accommodates the at least one slide including at least one projection that extends through an opening in the plate and an urging member.

16. The assembly according to claim 1, in combination with an imaging device.

17. A method of connecting a movable subsystem to a frame, comprising:

connecting the movable subsystem to the frame with at least one slide such that the weight of the subsystem transmits a force to the at least one slide, at least one projection of the at least one slide extending through at least one opening defined in the frame; and biasing the at least one projection of the at least one slide to at least partially counter the force transmitted to the at least on slide by the weight of the subsystem.

18. A device for connecting a movable subsystem to a frame that defines an opening, comprising:

means for connecting the movable subsystem to the frame, such that the weight of the subsystem transmits a force to the means for connecting, the means for connecting including at least one projection that extends through the opening defined in the frame; and means for biasing the at least one projection of the means for connecting to at least partially counter the force transmitted to the means for connecting by the weight of the subsystem.

* * * * *